Figure 1:
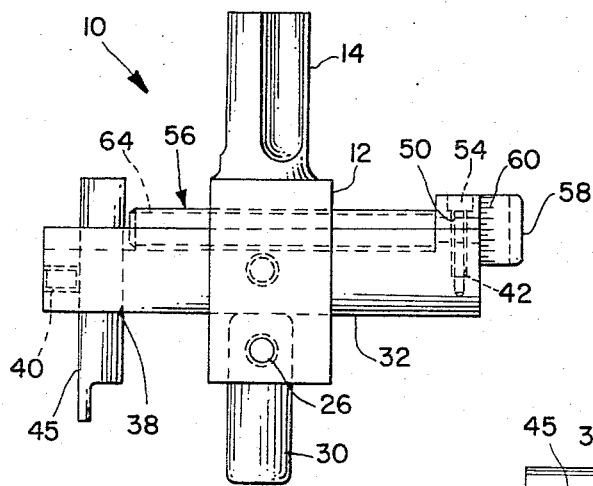

Feb. 28, 1967   H. L. DEMING   3,306,138
HOLE CUTTER
Filed July 6, 1964

INVENTOR.
HAROLD L. DEMING
BY

United States Patent Office 3,306,138
Patented Feb. 28, 1967

1

3,306,138
HOLE CUTTER
Harold L. Deming, 119 E. Barnes Ave.,
Lansing, Mich. 48910
Filed July 6, 1964, Ser. No. 380,300
8 Claims. (Cl. 77—77)

This invention relates to a hole cutter and more particularly to a device for cutting holes of a precise diameter.

Although various cutters exist for making holes in metal and the like they normally require the use of an additional tool for adjusting. This procedure is difficult and time consuming resulting in a setting which is not always accurate.

Composite tools have been devised whereby a reasonably accurate setting may be obtained originally; however, soon lose their accuracy upon repeated use. In many cases this is due to the fact that the screw used for adjusting hole size also carries the loads transmitted to and from the cutting tool. With this arrangement the screw threads soon wear resulting in a loose and sloppy arrangement. Furthermore, many of these tools are limited to cutting holes of a relatively small diameter.

The present invention overcomes many of the above problems by providing a very rugged structure compared to the physical size thereof. Furthermore, the hole cutter is designed so that loads are primarily transmitted through structure other than the adjusting screw. This structure is combined in a manner such that the tool adjusting mechanism is integrated with the support member resulting in an arrangement which will maintain its accuracy over a long interval of repeated use. Tool accuracy is also sustained during the cutting operation regardless of the type and size of stock. Due to the integrated arrangement the tool can be scaled up or down and is thereby readily adaptable to any sized operation. The structure is further designed so that the cutting tool position can be positively locked enhancing accuracy during operation.

It is, therefore, an object of this invention to provide a hole cutting tool which is extremely accurate.

Still another object of this invention is to provide a hole cutter having a cutting tool carrying structure which is integrated with the mechanism used for positioning the tool.

A further object of the invention is to provide a hole cutting tool that is of rugged construction in relationship to its size and weight.

Another object of the invention is to provide a hole cutting tool that is economical to manufacture and maintain.

An additional object of the invention is to provide a hole cutting tool whereby the cutting tool may be locked in position by structure apart from the adjusting screw.

Yet another object of the invention is to provide a hole cutting tool which retains its stability regardless of the size of the hole cut.

An object of the invention is to provide a hole cutting tool which has a micrometer adjustment for accuracy, the micrometer indicia being placed for easy visual adjustment.

These and other objects and advantages of the invention will become more apparent upon reading the specification in conjunction with the accompanying drawings.

Figure 2:
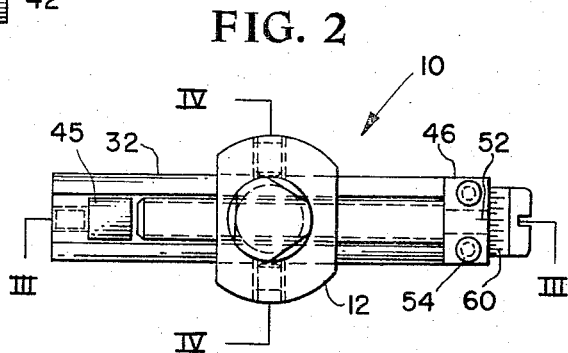

In the drawings:
FIGURE 1 is a side elevational view of the hole cutter;
FIGURE 2 is a plan view of the hole cutter;

2

Figure 4:
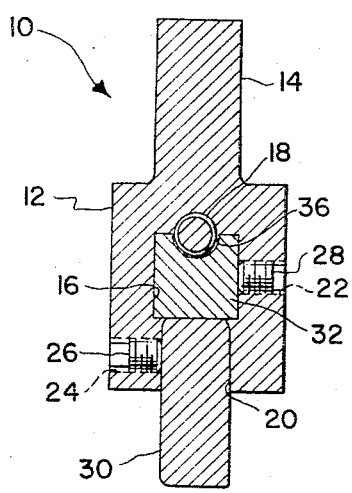
Figure 3:
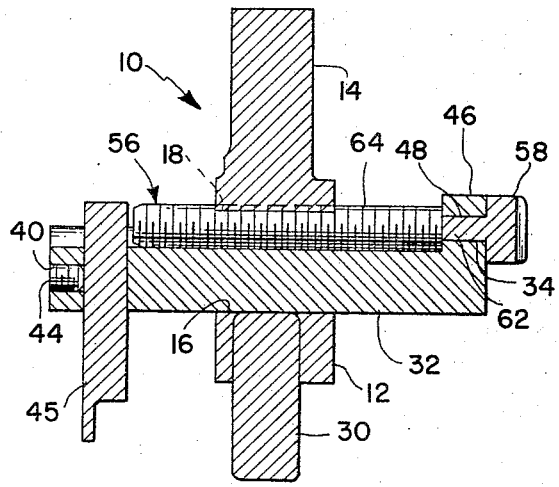

FIGURE 3 is a cross sectional view of the hole cutter taken along the section lines III—III of FIGURE 2; and
FIGURE 4 is a cross sectional view taken along the section lines IV—IV of FIGURE 2.

Basically, this invention relates to a hole cutter having a body or support structure which is designed to house a sliding carriage among other elements. The carriage releasably secures the cutting tool itself which is movable relative to the body for cutting a hole of the desired diameter. A lead screw is saddled in the carriage and has threaded engagement with the body. The lead screw thread is of the micrometer type and the head thereof as well as the tool body is provided with indicia for easy and accurate adjustment. A set screw is threaded in the body and bears against the carriage for locking the cutting tool in the desired position. A centering pin is secured to the body for locating the cutting tool with respect to the work piece or stock. The body also has a shank for attaching the hole cutter to the chuck of a power source.

Referring now more particularly to the details of the invention wherein like characters of reference designate like parts throughout the drawings, FIGURE 1 illustrates the hole cutter which is designated generally by the reference numeral 10.

The hole cutter 10 has a generally cylindrical body 12 with a reduced shank portion 14. Flat sides are machined at spaced intervals about the circumference of the shank to facilitate retention of the hole cutter in a chuck. The body 12 has an aperture formed therethrough which constitutes a bearing surface 16. The bearing surface is square shaped, although it may take some other shape, and three sides have full contact with the carriage to be explained more fully hereinafter. The remaining side provides bearing support for the carriage, but also has a threaded groove formed therein for receipt of the lead screw to be explained in detail subsequently. Opposite the shank 14 is a centering pin receptacle 20 formed in the body 12. The receptacle 20 receives the centering pin 30, held in position by a centering pin set screw 26 seated in a centering pin set screw aperture 24 tapped in the body 12.

The carriage 32 is of the same cross sectional configuration as the bearing surface 16. It has a groove 36 formed in the one side which opposes the threaded groove 18 formed in the body 12. The groove 36 is located centrally of the carriage and on one end thereof is a cutting tool receptacle 38 for receiving and holding the cutting tool 45. The cutting tool 45 is held in place by a cutting tool set screw 44 threaded into a tapped cutting tool set screw aperture 40 located in the end of the carriage. The other end of the carriage has a pillow or bearing area 34 for the neck of the lead screw to be explained more fully subsequently. Also located in the vicinity of the pillow 34 are threaded saddle block bores 42 which receive saddle block screws 54.

A generally U-shaped saddle block 46 has countersunk threaded apertures 50 which house the saddle block screws 54. The saddle block has a bearing surface 48 which engages the neck of the lead screw. The saddle block in conjunction with the carriage pillow forms a complete bearing area for the neck of the lead screw. The upper surface of the saddle block has a micrometer reference mark 52 which assists in positioning the cutting tool.

A lead screw 56 has a thread portion 64 throughout the majority of its length. A necked down or neck section 62 joins the threaded portion to the lead screw head 56. The screw head is provided with micrometer indicia 60 of conventional design. Although not shown the remainder of the screw head may be knurled to provide ease of turning and thus positioning of the cutting tool. As clearly shown in the various figures the lead screw has threaded engagement with the hole cutter body 12 and is cradled in the carriage 32.

The various elements of the hole cutter are made of machine steel and the cutting tool of tool stock. Although these materials have been utilized it is believed to be within the broadest aspect of the invention to use other materials.

OPERATION

From the above description the operation of the hole cutter is believed apparent. The particular type of cutting tool 45 needed for the job is installed by merely loosening the cutting tool set screw 44, inserting the proper cutting tool 45 and tightening the set screw.

By properly designing the lead screw threads 64 a given number of turns of the screw positions the cutting tool 45 a desired dimension from the centering pin 30. The device here described has a standard micrometer thread, however, it is believed within the skill of the artisan to vary this as the situation demands. The micrometer indicia can be calibrated so that the cutting tool can be positioned for cuts of accuracy down to tenths, hundreds and thousandths of an inch. It is believed obvious that as the screw is turned the carriage advances with respect to the body thus positioning the cutting tool.

The carriage set screw is loosened when a new setting is desired and thereafter tightened to lock the carriage and thereby the cutting tool in the proper position.

When the proper sized hole has been set the shank 14 is placed in the chuck of a drill press or other rotary power tool or machine. The stock is previously provided with a hole for the centering pin which properly locates the hole cutter with respect to the work piece. The hole cuter is then advanced into the work piece to cut the hole.

From the above description it is clear that the hole cutter is extremely rugged for its size and weight. Due to the design of the hole cutter the forces required for spinning the cutting tool and reactive forces are transferred primarily through and to the carriage rather than the lead screw. The integration of the carriage and body by the lead screw results in a positive cutting tool positioning arrangement which is very sturdy and will maintain accuracy even after long and repeated usage. Since the carriage set screw bears directly against the carriage, the carriage and cutting tool held thereby are definitely locked at a hole size setting resulting in another factor which will assure accuracy. Obviously, the carriage as well as the rest of the tool may be readily scaled up or down for various sized hole cutters. With the removable saddle block arrangement the lead screw and carriage may be readily removed and replaced by a longer or shorter carriage and lead screw to extend the capability of the hole cutter. Further, since the carriage carries the loads rather than the lead screw, accuracy is maintained when the hole cutter is fully extended or positioned to cut the largest hole. Also, since the carriage has bearing contact with all sides of the body bearing surface, long life is assured over an arrangement where the lead screw carries the load and the threads wear, becoming loose and sloppy. The hole cutter is designed so that the micrometer scale is easily read and the cutting tool easily adjusted even if the hole cutter is already located in the chuck of a power source.

While in the foregoing there has been described and shown a preferred embodiment of the invention, various modifications may become apparent to those skilled in the art to which the invention relates. Accordingly, it is not desired to limit the invention to this disclosure and various modifications may be resorted to, such as may lie within the spirit and scope of the appended claims.

I claim:

1. A hole cutter comprising: a body including a shank; a centering pin carried by said body; an aperture formed in said body; a carriage slidably mounted in said aperture; a screw having threaded engagement with said body aperture and cradled in said carriage; and a cutting tool carried by said carriage; a portion of said screw being engaged by said carriage preventing movement of said screw relative to said carriage other than rotative whereby rotation of said screw moves said carriage relative to said body to position said cutting tool for making various sized holes.

2. A hole cutter as in claim 1 wherein the threads on the screw are micrometer threads; said screw having a head for turning and advancing said carriage relative to said body; said carriage and screw head having micrometer indicia for accurately positioning the carriage.

3. A hole cutter as in claim 1 wherein said carriage has a portion thereof forming a pillow; said lead screw having a portion journaled in said pillow; saddle means having bearing engagement with said portion of said lead screw; said pillow and saddle positioning said lead screw relative to said body and carriage means; and said saddle being releasable to facilitate removal of said carriage and lead screw from said body means providing for easy interchange of different length carriages and lead screws.

4. A hole cutter as in claim 1 wherein said body means carries locking means directly engaging said carriage to fix said cutting tool relative to said body to insure accuracy.

5. A hole cutter comprising: a body including a shank; a centering pin carried by said body; an aperture formed in said body; a carriage slidably mounted in said aperture; a lead screw having threaded engagement with said body and cradled in said carriage; said lead screw in the area of said body completely surrounded by portions of said body and carriage and has continuous contact therewith; and a cutting tool carried by said carriage; a portion of said lead screw being engaged by said carriage whereby rotation of said screw moves said carriage relative to said body to position said cutting tool for making various size holes.

6. A hole cutter comprising: a body including a shank; a centering pin carried by said body; a passage formed in said body; a carriage slidably mounted in said passage; said carriage means having structure bearing on all sides with said body means to carry loads through and to said hole cutter; a screw having threaded engagement with said body and cradled in said carriage; and a cutting tool carried by said carriage; a portion of said screw being engaged by said carriage whereby rotation of said screw moves said carriage relative to said body to position said cutting tool for making various sized holes.

7. A hole cutter comprising: a body including a shank; a centering pin carried by said body; a passage formed in said body; a carriage slidably mounted in said passage; a lead screw having threaded engagement with said body and cradled in said carriage; said lead screw in the area of said body having continuous circumferential and longitudinal contact with said body means and carriage means; said carriage means having structural bearing on all sides with said body means; and a cutting tool carried by said carriage; a portion of said lead screw being engaged by said carriage whereby rotation of said screw moves said carriage relative to said body to position said cutting tool for making various sized holes.

8. A hole cutter comprising: a body; a shank formed integral with said body adapted to be received by a rotary power tool; a centering pin releasably received by said body opposing said shank; a carriage bed formed by an aperture through said body; a carriage slidably mounted in said body and having bearing contact with all sides of said aperture; a cutting tool releasably held by said carriage; threads formed in said carriage bed; a groove formed in said carriage opposite said carriage bed threads; a lead screw threaded in said carriage bed threads and cradled in said groove; a portion of said lead screw engaging said carriage for advancing said carriage relative to said body upon rotation of said screw providing settings for various hole sizes; and means carried by said body directly engaging said carriage for locking said carriage and thereby said cutting tool relative to said body.

References Cited by the Examiner

UNITED STATES PATENTS 3,130,610  4/1964  Bogdan _____ 77—77

FOREIGN PATENTS 1,122,612  5/1956  France.
116,118  12/1900  Germany.

FRANCIS S. HUSAR, *Primary Examiner.*